United States Patent [19]

Hazan

[11] 4,177,124
[45] Dec. 4, 1979

[54] PROCESS FOR ELECTRODEPOSITION OF GRAFT COPOLYMER

[75] Inventor: Isidor Hazan, Clementon, N.J.

[73] Assignee: E. I. Du Pont de Nemours and Company, Wilmington, Del.

[21] Appl. No.: 969,930

[22] Filed: Dec. 15, 1978

Related U.S. Application Data

[62] Division of Ser. No. 902,887, May 9, 1978.

[51] Int. Cl.² .................................................. C25D 13/06
[52] U.S. Cl. ........................................................ 204/181 C
[58] Field of Search ...................................... 204/181 C

[56] References Cited

U.S. PATENT DOCUMENTS

| | | | |
|---|---|---|---|
| 3,617,458 | 11/1971 | Brockman | 204/181 C |
| 4,115,227 | 9/1978 | Hazan | 204/181 C |
| 4,136,070 | 1/1979 | Hazan | 204/181 C |

*Primary Examiner*—Howard S. Williams

[57] ABSTRACT

A polyamine/epoxy ester graft copolymer having an acrylic polyamine backbone with secondary amine and hydroxy functionality, part of which is terminal primary hydroxy groups, onto which is grafted an epoxy-fatty acid ester. The ester is an epoxy resin reacted with a fatty acid resulting in a monoepoxide ester with one or less epoxy group per acid group. The ester is reacted with part of the secondary amine on the acrylic backbone. This system can be formulated to a nearly-neutral pH cathodic dispersion with good cure response at 150°–175° C. using conventional aminoplast crosslinkers.

3 Claims, No Drawings

PROCESS FOR ELECTRODEPOSITION OF GRAFT COPOLYMER

This is a division, of application Ser. No. 902,887, filed May 9, 1978.

BACKGROUND OF THE INVENTION

The present invention relates to graft copolymers and compositions suitable for cathodic electrodeposition of polymeric coatings. Furthermore, it relates to a method of cathodic electrodeposition of such graft copolymers.

It is known that organic coatings can be electrodeposited either on an anodically-charged conducting substrate or on a cathodically-charged substrate. Although most of the earlier work in electrodeposition was done with anodic deposition, that type of process has certain disadvantages. Anodic electrodeposition is normally done in a coating bath having a basic pH. The pH decreases at the surface being coated, creating conditions which, when combined with the electrolytic action of the coating bath, can cause the dissolution of substrate metal ions and their subsequent deposition in the coatings being formed. This can be a source of staining and diminished corrosion resistance. Also, electrolysis tends to attack preformed phosphate coatings on the anode. Furthermore, oxygen formed at the anodic substrate being coated can cause a variety of difficulties such as degradation of coatings by oxidation.

Electro-endoosmosis tends to expel water from anodic coatings being formed, leading to low water retention with about 85–95% solids in the coatings. This is an advantage over cathodic coating in which this phenomenon would not be expected to be helpful. (Parts and percentages herein are by weight except where indicated otherwise.)

Cathodic electrodeposition has developed more slowly, due in part to the acidic pH needed for the bath. Also, water tends to be drawn into the coatings and held there, along with acid residues from the bath. It is apparent that this can lead to difficulties in the coatings. In contrast to the oxygen formed at anodes in anodic electrodeposition, hydrogen is formed at the cathode in cathodic electrodeposition. Even though this hydrogen can cause pinholes in coatings, it, of course, does not cause oxidative film degradation.

Processes and compositions for the cathodic electrodeposition of paints are described in U.S. Pat. No. 2,345,543—Wohnsiedler, et al. (1944), which uses a cationic melamine-formaldehyde resin, and in U.S. Pat. No. 3,922,212—Gilchrist (1975), among others. Gilchrist is directed to a process for supplementing the bath composition with a make-up mixture of materials containing an ionizing acid that is not consumed at as fast a rate as the resin. The acid is present in the make-up at lower concentrations than are used in the bath, so as not to build up the concentration of the acid in the bath. Gilchrist uses particular aminoalcohol esters of polycarboxylic acids and discloses that acrylic polymers can be codeposited with zinc phosphate from solution on a cathodic substrate at low pH's such as 2.7 with phosphoric acid or volatile organic acids as the ionizing acid. Higher pH levels would be desirable for minimizing corrosion of coating equipment, especially if volatile nonpassivating acids are used for solubilization instead of phosphoric acid.

Two U.S. patents dealing with nitrogen-based copolymers and their cathodic electrodeposition are U.S. Pat. Nos. 3,455,806 and 3,458,420, both to Spoor, et al. (1969). Cathodic sulfonium systems are described by Wessling et al. on pages 110–127 of "Electrodeposition of Coatings," Ed. E. F. Brewed, American Chemical Society (1973).

Electrodeposition processes have been frequently described in the literature. Two useful reviews of the technology are: "Electro-painting Principles and Process Variables," Brower, Metal Finishing, September, 1976, p. 58; and "Coatings Update: Electrocoating," Americus, Pigment and Resin Technology, August, 1976, p. 17.

Dual cure cathodic electrocoating compositions are described in U.S. Pat. No. 4,070,258—McGinniss (1978) using a polymer with pendant tertiary amine groups, pendant mercaptan groups, an ethylenically-unsaturated carbonyl crosslinking agent and a photosensitizer. The deposited compositions are cured by using both heat and ultra-violet radiation. U.S. Pat. No. 4,066,523—McGinniss (1978) is similar except it uses a bis-maleimide crosslinking agent.

U.S. Pat. No. 4,066,525—Woo and Evans (1978) provides a cathodic electrocoating process using an aqueous dispersion of (a) an ionized reaction product of an epoxy resin and a monoamino alcohol or phenol, said reaction product also having a pendant hydrocarbon group, (b) an acid-functional aminoplast resin, and (c) a water-soluble acid solubilizer.

Cathodic electrocoating systems are based on alkaline cationic resins that are solubilized or dispersed in water with the aid of an acid. In order to minimize corrosion of tank construction materials, it has been the aim of the industry to develop technology that will result in cathodic systems that are stable in water at close to neutral pH. This could be achieved by incorporating in the cationic resin strong alkaline functionality such as quarternary ammonium salts, primary or secondary amines, or combinations thereof and solubilizing the resin in water by neutralizing the amine with a weak acid—usually an organic acid. Because of the high basicity of the deposited film, one of the major problems in the development of such cathodic systems has been to obtain adequate cure, using conventional aminoplasts as crosslinking agents, at relatively low temperatures of 150°–175° C., which are important for various applications such as in the automotive industry. The difficulty in obtaining adequate cure is caused by the fact that the crosslinking of conventional aminoplasts of the melamine benzoguanamine or urea formaldehyde type requires acid catalysis and is strongly inhibited by a basic environment. For this reason, technologies have been developed for cathodic systems that use partially or fully blocked isocyanates as the curing agents. The crosslinking of isocyanates is base-catalysed and requires a basic environment. Isocyanate crosslinking has several shortcomings, including the need for usually high temperature or catalysts to unblock the isocyanate, high cost, and toxicity of raw materials and possibly of oven effluent during bake. It has been felt that the cathodic electrocoating technology will be at a disadvantage if it is restricted to such mechanisms of cure.

None of the prior art provides a fully-satisfactory composition for cathodic electrocoating at nearly neutral pH with the ability to cure at relatively low temperatures and times, with or without a crosslinking agent.

SUMMARY OF THE INVENTION

The present invention provides a graft copolymer comprising a mono-epoxide portion grafted onto an acrylic-amine backbone portion, which portions consist essentially of, by weight based on the graft copolymer, about:

(a) 25-60%, preferably 28-37%, of an acrylic-amine backbone copolymer contributing:
  14.7-35%, preferably 16.5-21.8%, of secondary amine methacrylate, preferably tertiary butyl aminoethyl methacrylate, giving 0.08-0.2 equivalent of amine per 100 grams of graft copolymer,
  7-17%, preferably 7.8-10.4%, of hydroxy-functional acrylate or methacrylate, preferably hydroxy-ethyl methacrylate,
  3-7.3%, preferably 3.4-4.4%, of ethyl acrylate or methyl methacrylate, and
  0.3-0.7%, preferably 0.3-0.4%, mercapto-ethanol, giving primary terminal hydroxy functionality,
graft polymerized with (b) and (c):
(b) 33-60%, preferably 54-59%, of an epoxy-fatty acid copolymer of a condensation polymer of approximately equimolar proportions of epichlorohydrin and bisphenol-A reacted with fatty acids, preferably dehydrated castor oil fatty acid or 1,2-hydroxy stearic fatty acid. Linseed oil fatty acid, tall oil fatty acid or amine-containing fatty acids such as Ethomeen, produced by Armour Industrial Chemical Co., can also be used. The mole ratio of epoxy resin to fatty acid should be 1/1.4-1.7 so that the epoxy ester has less than one epoxy equivalent per molecule, and
(c) 7-15%, preferably 9-13%, of a glycidyl ester of a tertiary carboxylic acid containing 7-9 carbon atoms, preferably versatic acid, such as Cardura E, produced by Shell Oil Co.

A preferred embodiment consists essentially of, by weight based on the graft copolymer, about:

(a) 33% of an acrylic-amine backbone copolymer contributing:
  19.4% of tertiary butyl aminoethyl methacrylate, giving about 0.1 equivalent of amine per 100 grams of graft copolymer,
  9.3% hydroxyethyl methacrylate,
  4% ethyl acrylate, and
  0.3% mercaptoethanol,
graft copolymerized with (b) and (c):
(b) 55% of an epoxy-fatty acid copolymer of a condensation polymer of equimolar proportions of epichlorohydrin and bisphenol-A reacted with dehydrated castor oil fatty acid at a molar ratio of 1/1.7 epoxy resin to fatty acid, and
(c) 12% of Cardura E glycidyl ester.

After the grafting process, there are 0.05 equivalents per 100 g of graft copolymer of tertiary amine (a reaction product of the epoxy resin with the secondary amine) and 0.057 equivalents of secondary amine. It is important that the level of secondary amine not drop below 0.04 equivalents per 100 g of graft copolymer in order to obtain a stable dispersion at pH 6-7.

Another embodiment of this invention consists essentially of, by weight based on the graft copolymer, about:

(a) 25% of an acrylic-amine backbone copolymer contributing:
  14.7% of tertiary butyl aminoethyl methacrylate, giving about 0.008 equivalent of amine per 100 grams of graft copolymer,
  7% hydroxyethyl methacrylate,
  3% ethyl acrylate, and
  0.3% mercaptoethanol
graft polymerized with (b) and (c):
(b) 70% of an epoxy-fatty acid copolymer of a condensation polymer of equimolar proportions of epichlorohydrin and bisphenol-A reacted with dehydrated castor oil fatty acid at a molar ratio of epoxy resin to fatty acid of 1/1.7, and
(c) 5% of Cardura E glycidyl ester.

After the grafting process, there are 0.03 equivalents of tertiary amine and 0.05 equivalents of secondary amine per 100 g of graft copolymer.

The invention also provides coating compositions of such graft copolymers with a nitrogen resin crosslinker, preferably benzoguanamine-formaldehyde or urea-formaldehyde resins; as an ionizing agent, organic acid volatile at the curing temperature, preferably lactic, acetic, succinic or citric acids, present in an amount to give a pH of 6.0 to 7.0; and a liquid carrier, preferably an aqueous liquid carrier. Since the graft copolymers can crosslink themselves effectively, the nitrogen resin crosslinker can be omitted.

DETAILED DESCRIPTION OF THE INVENTION

In order to increase the pH of a cathodic electrocoating system without adversely affecting the cure response, using conventional aminoplasts such as benzoguanamine, urea formaldehyde and melamine formaldehyde resins as crosslinkers and obtaining satisfactory cures at about 150°-175° C., a new approach in the stabilization of the cathodic dispersion has been undertaken.

The approach minimizes the basicity inside the dispersion particle and maximizes it on the outside of the particle by controlling the coiling characteristics of the cationic polymer. This can be achieved by incorporation of the amine functionality on a flexible hydrophilic backbone with pendant hydrophobic epoxy ester groups so that most of the basic groups will be on the outside of the dispersion particle for maximum pH in the water phase and minimum basicity inside the particle for minimum inhibition of cure response of the deposited film.

The present invention provides cathodic systems which avoid limitations of isocyanate systems and have good cure response with conventional aminoplasts at temperatures of 150°-175° C. Dispersions with a pH of 6-7 are used, giving a deposited film with a pH of 7-10. The invention is based on a hydrophilic/hydrophobic graft system, with the hydrophilic backbone being a polyamine (primary and/or secondary) with hydroxy functionality, with some of the hydroxy groups preferably positioned as terminal hydroxy functionality at the end of the backbone molecule. Such a polyamine is preferably made from vinyl unsaturated acrylate and/or methacrylate esters of acrylic and/or methacrylic acid. This permits good control over the composition and structure of the backbone for optimum properties.

The polyamine backbone could also be made from other constituents such as polypropylene amine and/or polypropylene imine partially reacted with ethylene oxide in order to add further hydroxy functionality.

The hydrophobic part that is grafted on to the polyamine backbone is preferably an epoxy ester that is the reaction product of an Epon epoxy resin, an adduct of bisphenol-A and epichlorohydrin made by Shell Oil Co., with a fatty acid at molar ratios of epoxy/fatty acid of 1/1.4–1.7. The epoxy ester is formed by the reaction of the fatty acid with the epoxy group in the presence of a catalyst. The residual epoxy groups present in the epoxy ester are used to graft the epoxy ester on to the polyamine backbone by reacting the epoxy group with the amine functionality. Primary amines will become secondary and secondary will become tertiary after the reaction with the epoxy functionality. The presence of tertiary amines on the backbone is avoided in order to minimize the formation of quarternary ammonium salts that have an adverse effect on the electrocoatability of the system. As can be seen from the above epoxy/fatty acid ratios, not every epoxy ester molecule is grafted on to the polyamine backbone. This increases the electrical insulating properties of the wet electrodeposited film in the bath, resulting in the ability to deposit the paint deeper in blind holes, known as high throwing power.

Desirable characteristics of the hydrophobic/hydrophilic graft that permit the use of conventional aminoplasts with good cure response include the following:

(a) The hydrophilic backbone, the hydroxy-containing polyamine, acts as a stabilizer by wrapping itself around the hydrophobic portion of the graft copolymer when dispersed in water. This gives maximum pH in the water phase and maximum dispersion stability with minimum amount of amine functionality. The alkaline functionality is mostly on the outside of the particle, and there is very little inhibition to cure in the larger hydrophobic portion of the particle, the epoxy ester graft. By crosslinking the hydrophobic portion of the total system, any backbone connected to the epoxy ester through the graft mechanism becomes part of the crosslinked resin. Even the portions of the polyamine backbone that are not grafted with the epoxy ester have a self-crosslinking capability, mainly by transesterification of the hydroxy functionality with the acrylate esters. Such a reaction is catalyzed by the strong basic environment caused by the amine functionality. The backbone will self-crosslink by the above mechanism readily at relatively low temperatures of 120°–150° C.

(b) In order to obtain a stable dispersion at pH 6–7, part of the amine functionality is primary and/or, preferably, secondary amines. The minimum desirable amount of such an amine is 0.04–0.05 equivalents per 100 gm of total graft system.

(c) The hydroxy functionality on the polyamic backbone has a very important role. It contributes the hydrophilicity of the backbone, discussed in (a) above, and it introduces crosslinking sites for both transesterification in the preferred acrylic polyamine described in this invention and for crosslinking by the aminoplast mechanism. The minimum desirable level of hydroxy functionality is 0.4 equivalents per amine equivalent in the backbone.

A preferred composition of the invention can be made as follows, with the structural formulae schematically indicated.

The acrylic polyamine backbone is made by copolymerizing, in parts by weight:

12 ethyl acrylate/59 tertiary butyl aminoethyl methacrylate/28 hydroxyethyl methacrylate/1 mercaptoethanol.

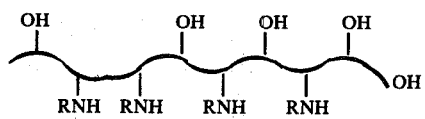

The epoxy ester graft is made by reacting 1 mole Epon 1004 and 1.7 moles dehydrated castor oil fatty acid.

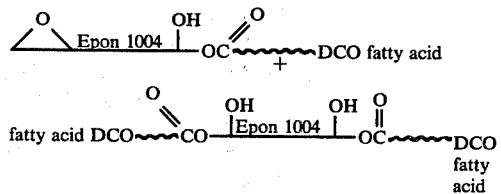

The graft copolymer is made by copolymerizing, in parts by weight:
33 acrylic backbone/55 epoxy ester/12 Cardura E.

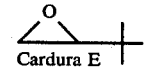

A coating composition is made from a clear formulation, in parts of solids content by weight, of:
70 graft copolymer resin/30 XM 1125 crosslinker, which is neutralized to 50% of stoichiometric with lactic acid, with water added.

More specifically, one can use 222 parts graft copolymer resin containing the codispersed diadduct of epoxy and fatty acid, 70 parts XM 1125 crosslinker, 9 parts 85% lactic acid, and 1700 parts water.

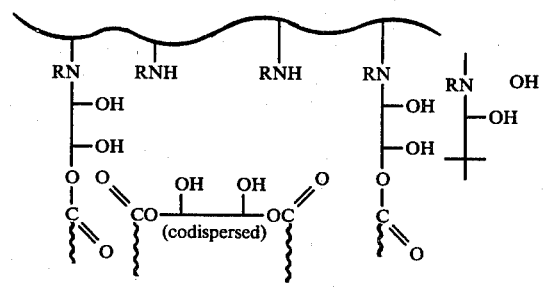

Coating compositions of the invention can be cathodically electrodeposited either on pretreated metal such as phosphatized steel or on bare metal such as steel which has been cleaned but not phosphatized. It can also be used on other metal substrates containing zinc, such as galvanized steel, as well as on aluminum and various alloys.

The lack of practical success of several previous cathodic electrodeposition painting processes is due at least in part to the amount of water that is held in the resin coating and the acids and salts that are dissolved in that water, not readily removable from the coating. The water can lead to coating failure by various mechanisms, and the acid residues can encourage subsequent corrosion, either directly or by providing a hygroscopic material in the coating which encourages penetration of water and other corrosive agents.

In contrast to the useful effect of electroendoosmosis at the anode in anodic electrodeposition of paint which tends to expel water from an anodic coating, water is not electrically expelled from a cathodic coating and may actually be drawn into the coating by electrical forces. However, water held in a cathodic coating can be particularly undesirable. To minimize such effects, the present invention provides resins with a degree of hydrophobicity and hardness or denseness of the coating which combine to expel water from the coating as the coating is formed.

The desirable effects of the invention are achieved by using certain hydrophobic graft copolymers containing in their backbone portions of tertiary and secondary amine functionality. Such functionality introduces an alkaline mechanism of adhesion of the resin coating to the substrate even after heating the deposited coatings to cause them to crosslink. This has been found to improve corrosion resistance of coatings when compared to coatings using an acidic mechanism of adhesion introduced by carboxylic groups such as in an anodic electrocoating system. This is an advantage over cathodic systems stabilized by onium groups, such as sulfonium and quarternary ammonium, in which hydrophobicity is only developed after thermal decomposition of the onium groups. Thermal decomposition of onium groups during crosslinking of the film would also make them unavailable for enhancing adhesion of the resin coating to the substrate.

In the process of the invention, although there are advantages in using live entry, in which the coating voltage is applied while the articles to be coated are being immersed into the bath, it will be apparent that reduced voltage can be applied upon entry if desired for certain special effects. However, the additional electrical apparatus required for reduced voltage entry is not normally necessary or desirable. It is desirable for the coated substrate to be removed from the bath with the coating voltage still applied or soon after it is turned off.

For operating electrocoating baths of the invention, the tank can be lined with an organic coating resistant to the mildy-acidic pH of the bath, and stainless steel or plastic piping and pump parts can be used to minimize corrosion. However, carbon steel parts and piping usually can be used as a material of construction without a corrosion problem.

Ultrafiltration can be used by recirculating the bath components to rinse contaminants and drag-out from the coated parts. Either membranes and ordinary flushed anodes or an acid deficient feed can be used, as is known in the art, to minimize the build-up of acid in the coating bath.

Although an uncoated tank can be used as the anode, in commercial practice one would normally use stainless steel anodes having a surface area smaller than that of the cathodic substrate which is to be coated. This gives a favorable current density distribution.

In the novel electrocoating process, the metal article providing the substrate to be coated is immersed in a bath of an electrocoating cell. The bath is an aqueous dispersion of preferably about 2–35% by weight of a cationic film-forming polymer at least partially neutralized with an organic acid which is volatile at the temperatures used to crosslink the paint film. Suitable acids include lactic, acetic, succinic and citric acids. Preferably lactic acid is used in an amount of from 30% of that required for stoichiometric reaction of the hydrogen of the acid with all of the available amine group bonds in the polymer to about 100% of stoichiometric. It is more preferably to use about 50%. The use of less than about 30% of the stoichiometric amount of acid can lead to instability in the bath. More than 100% can lead to undesirable excess acidity in the bath with consequent corrosion of coating equipment. The preferred pH of the coating bath is about 6.5–7.0.

The metal article is connected to the negative side of a direct current (D.C.) power source to become the cathode of the cell. A voltage of about 1 to 550 volts is passed through the cell for the full dwell time of the article in the bath, about 0.01 to 5 minutes, preferably 2 minutes, and a coating of the cationic polymer is deposited. When the coating reaches the desired thickness, the article is removed from the bath. Preferably, the article is rinsed with water and/or with ultra-filtrate taken from the bath, to remove excess coating. Then the article is dried at ambient temperatures or baked for about 5 to 40 minutes at about 100° to 200° C., preferably about 30 minutes at 175° C., to give a finished coating about 0.1 to 5 mils thick. Typical efficiencies of about 30 mg film solids deposited per coulomb of electricity are obtained.

The current density used in the electrocoating cell generally does not exceed 1.85 amperes/cm$^2$ (0.3 amperes/in$^2$) of anode surface which is immersed in the bath, and it is preferable to use lower current densities. In the deposition of the cationic film-forming polymer, voltages of 5 to 400 for 0.25 to 2 minutes are preferred to form a high-quality finish.

Coating compositions of the present invention can contain pigments. The pigments are normally added to the composition in the usual manner by forming a mill base or pigment dispersion with the pigment and the afore-mentioned cationic film-forming polymer or another water-dispersible polymer or surfactant. This mill base is then blended with additional film-forming constituents and the organic solvents. When the mill base is subsequently acidified and dispersed in water, the polymers tend to wrap themselves around the pigments. This has the effect of preventing destabilization of the dispersion or other undesirable effects that could come from using a basic pigment such as $TiO_2$ or lead silicate in an acid stabilized dispersion. Other pigments that could be used include metallic oxides such as zinc oxides, iron oxides, and the like, metal flakes such as aluminum flake, metal powders, mica flakes with and without surface treatment such as with titania and carbon black, chromates such as lead chromates, sulfates, carbon black, silica, talc, lead silicates, aluminum silicates including china clay and finely divided kaolin, organic pigments and soluble organic dyes.

Aside from cathodic electrodeposition, the novel coating compositions of the present invention can also be applied by any conventional method such as spraying, electrostatic spraying, dipping, brushing, flowcoating and the like. Reaction of the amine groups of the polymer with an acid is generally not necessary when the coating composition is to be used for purposes other than electrodeposition. Other organic thermally-decomposable acids, such as formic acid, can be used to obtain water solubility for such purposes. The coating would then be baked for about 5 to 40 minutes at about 150° to 200° C. to give coatings of about 0.1–5 mils thickness. When applied by cathodic electro-deposition, coating compositions of the invention are preferably applied to give dried thicknesses of about 0.8–1.2 mils.

A valuable attribute of this invention is the ability to crosslink a cationic resin which is alkaline in nature with conventional nitrogen formaldehyde resins which usually require an acidic environment as a catalyst, with curing at temperatures of 150°–175° C. A crosslinking agent which can be water dispersed along with the film-forming constituent is used in the coating composition. Based on the proportions of solids in the bath, which are roughly equal to the proportions of solids in the film, about 60 to 95%, preferably about 70%, of cationic film-forming polymer are used along with about 5 to 40%, preferably about 30%, of crosslinking agent.

Typical crosslinking agents that can be used with the invention are melamine formaldehyde, alkylated melamine-formaldehyde resins such as hexakis-(methoxymethyl) melamine and partially-methylated melamine formaldehyde resins, butylated melamine formaldehyde resins, methylated urea-formaldehyde resins, urea-formaldehyde resins, phenol-formaldehyde and the like. One particularly useful crosslinking agent which forms a high-quality product with the cationic polymers is a benzoguanamine-formaldehyde resin used in conjunction with a urea-formaldehyde resin such as Beetle 80, produced by American Cyanamid Co. A preferred benzoguanamine formaldehyde resin is XM 1125, also produced by American Cyanamid Co.

When the novel compositions of this invention are used as primers over metals including treated and untreated steel, aluminum and other metals, conventional acrylic enamels, acrylic dispersion enamels and other coating compositions can be applied directly as topcoats over such primers. Acrylic lacquers, acrylic dispersion lacquers, and acrylic powder coatings can be applied over the novel compositions, but a suitable intermediate coat such as a sealer can be used to improve adhesion of the lacquer or powder topcoats to the primer.

The epoxy graft used in compositions of the invention contributes sufficient hydrophobicity to the polymer so that the electrodeposited film contains at least about 83% solids, and preferably 85 to 95% solids. Although such high solids levels are not uncommon for anodically-deposited coatings, they are not readily achieved in cathodic electrodeposition because of the amount of water usually entrapped.

Compositions of the invention can include additional adjuvants that do not materially change the basic and novel characteristics of the invention and thus are within the scope of "consisting essentially" terminology. Some such adjuvants are thickeners, defoamers, pigments, microgels, pigments dispersants, polymeric powders, microbiocides, and coalescing solvents. Typical coalescing solvents which might be used at a concentration of about 0.5% of the total bath volume are ethylene glycol monobutyl ether, diethylene glycol monobutyl ether, cyclohexanol and hexylcellosolve.

Although it is difficult to meaningfully quantify the softness or hardness of the resin, it is known that certain resins of the invention have a degree of hardness which is useful in combination with the hydrophobicity characteristics of the resins in forcing water out of films to obtain the indicated levels of retained water and acid.

The molecular weights of polymers of the invention are generally not critical. However, typical average molecular weights determined by gel permeation chromatography are: for the acrylic-amine backbone portion—10,000 to 12,000, for the epoxy-fatty acid portion—1,500 to 3,000, and for the reacted graft copolymer—about 12,000.

Although thoughts are expressed herein on why and how the advantages of the invention are obtained, the invention is defined by the claims and does not depend upon theories.

Specific examples will now be given of the preparation of graft copolymers of the invention and their use in cathodic electrodeposition processes of the invention.

BEST MODE

Depending on the properties sought, the invention has various best modes, illustrated by the examples.

EXAMPLE I

A black primer coating composition is prepared and used as follows:

Part I and Part II describe the two resin compounds that are graft polymerized and used with the pigment dispersions of Part III in the paint of Part IV.

PART I

This part describes the preparation of an epoxy ester for graft copolymerization.

The following ingredients are charged into a reaction vessel equipped with a stirrer, thermometer, reflux condenser and a heating mantle to form an epoxy ester resin solution:

| Portion 1 | Parts by Weight |
| --- | --- |
| Epoxy resin (Epon 1004) | 1250.00 |
| Dehydrated castor oil fatty acid | 250.00 |
| Ethylene glycol monoethyl-ether | 500.00 |

(Epon 1004 is an epoxy resin of the formula

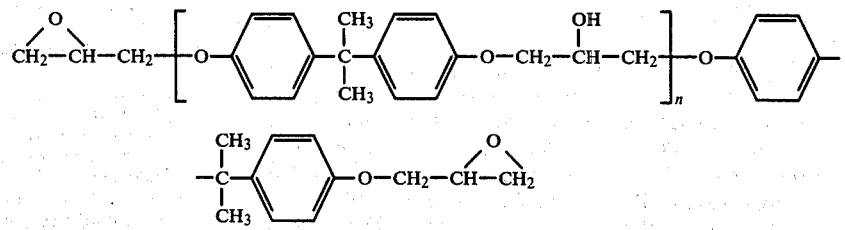

where m is an integer sufficiently large to provide a Gardner-Holdt viscosity at 25° C. of G-I measured in a 40% weight solids polymer solution using ethylene glycol monobutyl ether solvent. The resin has an epoxide equivalent -continued

| Portion 1 | Parts by Weight |
|---|---|
| of 950–1050 and is produced by Shell Oil Co.) | |

| Portion 2 | Parts by Weight |
|---|---|
| Benzyl trimethylamonium hydroxide | 2.50 |

Portion 1 is charged into the reaction vessel, blanketed with nitrogen and heated to about 128°–140° C. to melt the resin. Portion 2 is then added, and the ingredients are heated to about 135°–145° C. for about 5 hours with constant agitation until the reaction mixture has an acid number of 0.01.

The resulting epoxy ester resin solution has a solids content of about 75%, an acid number no higher than 0.01, an epoxide equivalent of 3800–4500, and a Gardner-Holdt viscosity of F-H at 25° C. in a 40% solids polymer solution using ethylene glycol monoethyl ether solvent.

PART II

This part describes the preparation of an acrylic resin and the graft polymerization of the epoxy ester described above onto it.

| | Parts by Weight |
|---|---|
| Portion 1 | |
| Isopropanol | 400.00 |
| Portion 2 | |
| Ethylacrylate | 75.00 |
| Tertbutylaminoethyl methacrylate | 370.00 |
| Hydroxyethyl methacrylate | 175.00 |
| Mercaptoethanol | 10.00 |
| Portion 3 | |
| Isopropanol | 100.00 |
| Methylethyl ketone | 25.00 |
| Azobisisobutyronitrile | 10.00 |
| Portion 4 | |
| Methylethyl ketone | 8.00 |
| Azobisisobutyronitrile | 1.00 |
| Portion 5 | |
| Ethylene glycol monoethyl ether | 533.00 |
| Portion 6 | |
| Epoxy ester prepared in Part 1 | 1356.00 |
| Etylene glycol monoethyl ether | 350.00 |
| Cardura E-10 (glycidyl ester of epichlorohydrin reacted with versatic acid 911, produced by Shell Oil Co.) | 340.00 |
| Benzyltrimethylammonium hydroxide | 10.00 |

Portion 1 is charged into a reaction vessel, equipped as described above, and is heated to its reflux temperature. The reaction mixture is held under nitrogen during the entire reaction. Portions 2 and 3 are separately premixed and added slowly simultaneously over a 60-minute period while maintaining the reaction mixture at its reflux temperature. The reaction is continued for an additional 60 minutes. The Portion 4 is added, and the reaction mixture is held at its reflux temperature for an additional 30 minutes. Stripping of the reaction solvent is conducted simultaneously with the addition of Portion 5 which is to replace the reaction solvent. When 533.00 parts of solvent are stripped and all of Portion 5 is added to the reaction vessel, Portion 6 is added and the temperature is brought to 115°–117° C. and maintained for 4 hours with continuous agitation. At the end of that period the epoxy number is determined. When the epoxy equivalent is zero or less than 1 epoxy unit per 500,000 gm, the reaction is finished. The solids content is 60%, and the Gardner-Holdt viscosity at 25% reduction of solids with ethylene glycol monoethylether is U to X.

PART III

A black pigment dispersion is prepared as follows:

| | Parts by Weight |
|---|---|
| Solution polymer prepared in Part II | 371.00 |
| Ethylene glycol monoethylether | 31.00 |
| Carbon black pigment | 31.80 |

The above ingredients are premixed and charged into a conventional sand mill and ground at a rate of 30 gallons per minute while controlling the temperature of the mixture below 70° C. The resulting carbon black dispersion has about 58% solids content.

An extender pigment dispersion using diatomaceous earth as the extender pigment is prepared as follows:

| | Parts by Weight |
|---|---|
| Solution polymer prepared in Part II | 225.00 |
| Ethylene glycol monoethylether | 110.00 |
| Diatomaceous earth pigment | 206.00 |

The above ingredients are premixed and charged into a conventional sand mill and ground at a rate of 30 gallons per minute while controlling the temperature of the mixture below 70° C. The resulting diatomaceous earth dispersion has about 63% solids.

PART IV

The electrocoating composition of a flated black paint is prepared as follows:

| | Parts by Weight |
|---|---|
| Portion 1 | |
| Resin solution of Part II | 373.00 |
| Black pigment dispersion of Part III | 97.00 |
| Diatomaceous earth pigment dispersion of Part III | 440.00 |
| Benzoguanamine formaldehyde soluton (XM 1125 produced by American Cyanamid Co., 85% in ethylene glycol monobutyl ether) | 76.00 |
| Urea formaldehyde resin (Beetle-80, produced by American Cyanamid Co.) | 100.00 |
| Portion 2 | |

|  | Parts by Weight |
| --- | --- |
| Deionized water | 632.00 |
| Lactic acid 85% solution in water | 10.00 |

Portion 1 is added into a mixing vessel, heated to 150° F. and mixed for 3 hours, maintaining a temperature of 150° F. Portion 2 is added into another mixing vessel mixed for 10 minutes, and Portion 1 is added into Portion 2 with continuous agitation. The pigmented water dispersion is mixed for 2 hours and diluted to about 15% solids with deionized water.

Industrial Applicability

The electrocoating composition, having a pH of 6.2–6.5 and a conductivity of 700–1000 micromhos, is charged into a stainless steel tank for electrodeposition. An untreated cold rolled steel panel or a phosphatized steel panel is positioned in the center of the tank, electrically connected to the negative side of a DC power source, and forms the cathode of the electrocoating cell. The tank is connected to the positive side of a DC power source and forms the anode of the cell. A direct current of 150–300 volts is applied to the cell for 2 minutes at an ambient temperature of 20°–25° C., and a paint film of about 0.6 mils is deposited on the panel. The coated metal panel is removed from the electrocoating cell, washed and baked at about 160° C. for 30 minutes. The resulting primer film has excellent adhesion to the metal substrate, is hard and has very good corrosion and saponification resistance over bare cold rolled steel and phosphatized steel. An acrylic enamel adheres to the primer film, and conventional acrylic lacquers can be applied with a conventional sealer coat over the primer to form a high-quality finish.

Typical deposited films contain 90 to 95% solids and 10 to 12% of the concentration of the lactic acid present in the bath.

This coating composition is particularly useful for priming automobile and truck bodies by electrodeposition for maximum corrosion protection over all parts of the car including areas of poor phosphate pretreatment or no pretreatment at all.

EXAMPLE II

A black primer coating composition is prepared and used as follows:

Part I and Part II describe the two resin compounds that are graft polymerized and used with the pigment dispersions of Part III in the paint of Part IV.

PART I

This part describes the preparation of an epoxy ester for graft copolymerization.

The following ingredients are charged into a reaction vessel equipped with a stirrer, thermometer, reflux condenser and a heating mantle to form an epoxy ester resin solution:

| Portion 1 | Parts by Weight |
| --- | --- |
| Epoxy resin (Epon 1001) | 1500.00 |

(Epon 1001 is an epoxy resin of the formula

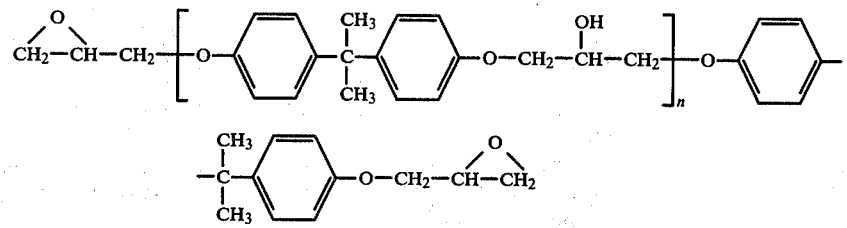

where m is an integer sufficiently large to provide a Gardner-Holdt viscosity at 25° C. of D-G measured in a 40% weight solids polymer solution using ethylene glycol monobutyl ether solvent. The resin has an epoxide equivalent of 450–550 and is produced by Shell Oil Co.)

|  | Parts by Weight |
| --- | --- |
| Portion 2 | |
| Dehydrated castor oil fatty acid | 630.00 |
| Benzyl trimethylamonium hydroxide | 3.00 |
| Portion 3 | |
| Ethylene glycol monoethyl ether | 710.00 |

Portion 1 is charged into the reaction vessel, blanketed with nitrogen and heated to about 128°–140° C. to melt the resin. Portion 2 is then added, and the ingredients are heated to about 150°–160° C. for about 3 hours with constant agitation until the reaction mixture has an acid number of 0.01. Portion 3 is added, and the ingredients are cooled and filtered.

The resulting epoxy ester resin solution has a solids content of about 75%, an acid number no higher than 0.01, an epoxide equivalent of 3500–4200, and a Gardner-Holdt viscosity of D-F at 25° C. in a 40% solids polymer solution using ethylene glycol monoethyl ether solvent.

PART II

This part describes the preparation of an acrylic resin and the graft polymerization of the epoxy ester described above onto it.

|  | Parts by Weight |
| --- | --- |
| Portion 1 | |

-continued

|  | Parts by Weight |
|---|---|
| Isopropanol | 400.00 |
| Portion 2 | |
| Methylmethacrylate | 75.00 |
| Tertbutylaminoethyl methacrylate | 370.00 |
| Hydroxyethyl methacrylate | 175.00 |
| Mercaptoethanol | 10.00 |
| Portion 3 | |
| Isopropanol | 100.00 |
| Methylethyl ketone | 25.00 |
| Azobisisobutyronitrile | 10.00 |
| Portion 4 | |
| Methylethyl ketone | 8.00 |
| Azobisisobutyronitrile | 1.00 |
| Portion 5 | |
| Ethylene glycol monoethyl ether | 533.00 |
| Portion 6 | |
| Epoxy ester prepared in Part 1 | 1696.00 |
| Ethylene glycol monoethyl ether | 350.00 |
| Benzyltrimethylammonium hydroxide | 10.00 |

Portion 1 is charged into a reaction vessel, equipped as described above, and is heated to its reflux temperature. The reaction mixture is held under nitrogen during the entire reaction. Portions 2 and 3 are separately premixed and added slowly simultaneously over a 60-minute period while maintaining the reaction mixture at its reflux temperature. The reaction is continued for an additional 60 minutes. The Portion 4 is added, and the reaction mixture is held at its reflux temperature for an additional 30 minutes. Stripping of the reaction solvent is conducted simultaneously with the addition of Portion 5 which is to replace the reaction solvent. When 533.00 parts of solvent are stripped and all of Portion 5 is added to the reaction vessel, Portion 6 is added and the temperature is brought to 115°–117° C. and maintained for 4 hours with continuous agitation. At the end of that period the epoxy number is determined. When the epoxy equivalent is zero or less than 1 epoxy unit per 500,000 gm, the reaction is finished. The solids content is 60%, and the Gardner-Holdt viscosity at 25% reduction of solids with ethylene glycol monoethylether is U to X.

PART III

A black pigment dispersion is prepared as follows:

|  | Parts by Weight |
|---|---|
| Solution by polymer prepared in Part II | 371.00 |
| Ethylene glycol monoethyl-ether | 31.00 |
| Carbon black pigment | 31.80 |

The above ingredients are premixed and charged into a conventional sand mill and ground at a rate of 30 gallons per minute while controlling the temperature of the mixture below 70° C. The resulting carbon black dispersion has about 58% solids content.

An extender pigment dispersion using lead silicate as the extender pigment is prepared as follows:

|  | Parts by Weight |
|---|---|
| Solution polymer prepared in Part II | 225.00 |
| Ethylene glycol monoethyl-ether | 110.00 |
| Lead silicate pigment | 206.00 |

The above ingredients are premixed and charged into a conventional sand mill and ground at a rate of 30 gallons per minute while controlling the temperature of the mixture below 70° C. The resulting lead silicate dispersion has about 63% solids.

PART IV

The electrocoating composition of a flated black paint is prepared as follows:

|  | Parts by Weight |
|---|---|
| Portion 1 | |
| Resin solution of Part II | 373.00 |
| Black pigment dispersion of Part III | 97.00 |
| Lead silicate pigment dispersion of Part III | 440.00 |
| Benzoguanamine formaldehyde solution (XM 1125 produced by American Cyanamid Co., 85% in ethylene glycol monobutyl ether) | 76.00 |
| Urea formaldehyde resin (Beetle-80, produced by American Cyanamid Co.) | 100.00 |
| Portion 2 | |
| Deionized water | 632.00 |
| Lactic acid 85% solution in water | |

Portion 1 is added into a mixing vessel, heated to 150° F. and mixed for 3 hours, maintaining a temperature of 150° F. Portion 2 is added into another mixing vessel mixed for 10 minutes, and Portion 1 is added into Portion 2 with continuous agitation. The pigmented water dispersion is mixed for 2 hours and diluted to about 15% solids with deionized water.

Industrial Applicability

The electrocoating composition, having a pH of 6.5–7.0 and a conductivity of 700–1000 micromhos, is charged into a stainless steel tank for electrodeposition. An untreated cold rolled steel panel or a phosphatized steel panel is positioned in the center of the tank, electrically connected to the negative side of a DC power source, and forms the cathode of the electrocoating cell. The tank is connected to the positive side of a DC power source and forms the anode of the cell. A direct current of 150 volts is applied to the cell for 2 minutes at an ambient temperature of 20°–25° C., and a paint film of about 0.6 mils is deposited on the panel. The coated metal panel is removed from the electrocoating cell, washed and baked at about 160° C. for 30 minutes. The resulting primer film has excellent adhesion to the metal substrate, is hard and has very good corrosion and saponification resistance over bare cold rolled steel and phosphatized steel. An acrylic enamel adheres to the primer film, and conventional acrylic lacquers can be applied with a conventional sealer coat over the primer to form a high-quality finish. Typical deposited films contain 90–95% solids.

This coating composition is particularly useful for priming automobile and truck bodies by electrodeposition for maximum corrosion protection over all parts of the car including areas of poor phosphate pretreatment or no pretreatment at all, due to its good throwing power of 13–15 inches obtained with a standard automotive test method.

I claim:

1. In a process for electrocoating with paint a cathodically-charged substrate immersed in a coating bath containing an aqueous dispersion of said paint, said bath having a cathode zone containing said substrate and an anode zone containing a charged anode, the charged electrodes being maintained in electrical contact with each other by means of said bath, wherein said bath comprises a cationic film-forming polymer, an acidic ionizing agent, the improvement which comprises:

employing an organic acid which is volatile at temperatures used to crosslink the film-forming polymer as the acidic ionizing agent;

employing as the cationic film-forming polymer a graft copolymer comprising a mono-epoxide portion grafted onto an acrylic-amine backbone portion, which portions consist essentially of, by weight based on the graft copolymer about:

(a) 25–60% of an acrylic-amine backbone copolymer contributing:

14.7–35% of secondary amine acrylate or methacrylate, giving 0.08 to 0.2 equivalent of tertiary amine per 100 grams of graft copolymer, 7–17% of hydroxy-functional acrylate or methacrylate, 3–7.3% ethyl acrylate or methyl methacrylate, and 0.3–0.7% mercaptoethanol, giving primary terminal hydroxyl functionality, graft copolymerized with (b) and (c):

(b) 33–60% of an epoxy-fatty acid copolymer of a condensation polymer of equimolar proportions of epichlorohydrin and bisphenol A, said condensation polymer being reacted with fatty acid in the range of 1/1.4–1.7, and (c) 7–15% of a glycidyl ester of a tertiary carboxylic acid containing 7 to 9 carbon atoms, and subsequently curing the paint to crosslink the film-forming polymers.

2. In a process for electrocoating with paint a cathodically-charged substrate immersed in a coating bath containing an aqueous dispersion of said paint, said bath having a cathode zone containing said substrate and an anode zone containing a charged anode, the charged electrodes being maintained in electrical contact with each other by means of said bath, wherein said bath comprises a cationic film-forming polymer, an acidic ionizing agent, and a crosslinking agent, the improvement which comprises:

employing an organic acid which is volatile at temperatures used to crosslink the film-forming polymer as the acidic ionizing agent;

employing as the cationic film-forming polymer a graft copolymer of claim 1, and employing as the crosslinking agent a composition which is nonreactive in the bath but reactive with said film-forming polymer at elevated temperatures to crosslink the polymers to form a durable paint film, and subsequently curing the paint to crosslink the film-forming polymers.

3. In a process for electrocoating with paint a cathodically-charged substrate immersed in a coating bath containing an aqueous dispersion of said paint, said bath having a cathode zone containing said substrate and an anode zone containing a charged anode, the charged electrodes being maintained in electrical contact with each other by means of said bath, wherein said bath comprises a cationic film-forming polymer, an acidic ionizing agent, and a crosslinking agent, the improvement which comprises:

employing an organic acid which is volatile at temperatures used to crosslink the film-forming polymer as the acidic ionizing agent;

employing as the cationic film-forming polymer a graft copolymer of claim 1, and employing as the crosslinking agent a composition which is nonreactive in the bath but reactive with said film-forming polymer at elevated temperatures to crosslink the polymers to form a durable paint film, and subsequently curing the paint to crosslink the film-forming polymers by heating the coated substrate to a temperature of at least about 175° C. for at least about 30 minutes.

* * * * *